US010222221B2

(12) United States Patent
Bellotti et al.

(10) Patent No.: US 10,222,221 B2
(45) Date of Patent: Mar. 5, 2019

(54) SYSTEM AND METHOD FOR OPTIMIZING PASSENGER PICK-UP

(71) Applicant: Conduent Business Services, LLC, Dallas, TX (US)

(72) Inventors: Victoria M. E. Bellotti, San Francisco, CA (US); Christian W. Fritz, Menlo Park, CA (US); Shane P. Ahern, Belmont, CA (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 0 days.

(21) Appl. No.: 15/438,591

(22) Filed: Feb. 21, 2017

(65) Prior Publication Data

US 2018/0238694 A1    Aug. 23, 2018

(51) Int. Cl.
  *G01C 21/34*    (2006.01)
  *G01C 21/36*    (2006.01)
  *G06Q 10/02*    (2012.01)
  *G06Q 10/04*    (2012.01)
  *G06Q 10/10*    (2012.01)
  *G06Q 50/30*    (2012.01)
  *G08G 1/005*    (2006.01)

(52) U.S. Cl.
  CPC ..... *G01C 21/3438* (2013.01); *G01C 21/3415* (2013.01); *G01C 21/3423* (2013.01); *G01C 21/3492* (2013.01); *G01C 21/362* (2013.01); *G01C 21/3667* (2013.01); *G01C 21/3691* (2013.01); *G06Q 10/025* (2013.01); *G06Q 10/047* (2013.01); *G06Q 10/1095* (2013.01); *G06Q 50/30* (2013.01); *G08G 1/005* (2013.01)

(58) Field of Classification Search
  CPC ............ G01C 21/3438; G01C 21/3492; G01C 21/3667; G01C 21/3691; G01C 21/3415; G01C 21/3423; G01C 21/362; G06Q 50/30; G06Q 10/025; G06Q 10/1095; G06Q 10/047; G08G 1/005
  See application file for complete search history.

(56) References Cited

U.S. PATENT DOCUMENTS

| 6,459,986 | B1* | 10/2002 | Boyce | G01C 21/3438 701/465 |
| 9,269,103 | B1* | 2/2016 | Kumar | G06Q 30/0605 |
| 9,816,824 | B1* | 11/2017 | Racah | G01C 21/3438 |
| 2004/0158483 | A1* | 8/2004 | Lecouturier | G06Q 10/025 705/6 |
| 2005/0219056 | A1* | 10/2005 | McHugh | G07C 9/00103 340/573.4 |

(Continued)

*Primary Examiner* — Russell Frejd
(74) *Attorney, Agent, or Firm* — Shun Yao; Park, Vaughan, Fleming & Dowler LLP

(57) ABSTRACT

One embodiment provides a system that facilitates optimization of passenger pick-up. During operation, the system generates, by a first mobile computing device associated with a passenger at a first location, a request for a target location at which to meet with a vehicle. The system receives the target location and a planned passenger route for the passenger to the target location, which are calculated based on a location, facing direction, and direction of movement, if any, of the vehicle, and wherein the target location is different from the first location, thereby facilitating optimization of a time duration and route the passenger takes to meet the vehicle.

20 Claims, 9 Drawing Sheets

(56) References Cited

U.S. PATENT DOCUMENTS

| | | | |
|---|---|---|---|
| 2013/0218455 A1* | 8/2013 | Clark | G06Q 50/30 |
| | | | 701/411 |
| 2015/0100238 A1* | 4/2015 | Cai | G01C 21/34 |
| | | | 701/537 |
| 2015/0323333 A1* | 11/2015 | Lord | G01C 21/34 |
| | | | 701/117 |
| 2015/0377635 A1* | 12/2015 | Beaurepaire | G01C 21/3423 |
| | | | 701/408 |
| 2016/0027307 A1* | 1/2016 | Abhyanker | G08G 1/005 |
| | | | 701/117 |
| 2016/0364823 A1* | 12/2016 | Cao | G06Q 50/30 |
| 2017/0052034 A1* | 2/2017 | Magazinik | G01C 21/3438 |

* cited by examiner

SYSTEM AND METHOD FOR OPTIMIZING PASSENGER PICK-UP

BACKGROUND

Field

This disclosure is generally related to transportation. More specifically, this disclosure is related to a system and method for optimizing passenger pick-up by responding to passenger and vehicle actions while en route to a dynamically determined and updated pick-up location.

Related Art

On-demand ride services continue to grow at a rapid pace. In a typical on-demand ride service application, a (would-be) passenger can request a ride by providing the passenger's location, and an identified nearby vehicle can receive and respond to the request. The application can send an estimated time duration for the vehicle to arrive at the passenger's location. Some applications allow a passenger to request a "carpool" option, taking into account factors such as the final destination of multiple requesting passengers. Still other applications provide predetermined "hotspot" pick-up locations, where multiple passengers may congregate and wait for a vehicle. These applications typically allow the passenger to view the location of the vehicle as the vehicle drives to the passenger's location or the predetermined pick-up location. So, the passenger can see the current and moving location of the vehicle while waiting for the vehicle at the passenger's location or while walking to the predetermined pick-up location.

If the vehicle encounters an unexpected traffic condition, the vehicle may need to take a more circuitous route to the passenger's location or the predetermined pick-up location. Upon seeing the vehicle's current and moving progress, and upon observing current traffic conditions in the passenger's realm of view, the passenger may realize that he can quickly reach the vehicle simply by, e.g., walking one block. However, current applications do not recommend an optimal time-saving pick-up location, based upon passenger walking speed, pedestrian accessibility, and traffic conditions. Nor do they inform the vehicle (or the driver of the vehicle) of a new pick-up location chosen by the passenger or by an algorithm. Furthermore, current applications do not allow the vehicle to inform the passenger of an unexpected changed route or a new pick-up location based on current dynamic traffic conditions identified by the driver or an algorithm.

SUMMARY

One embodiment provides a system that facilitates optimization of passenger pick-up. During operation, the system generates, by a first mobile computing device associated with a passenger at a first location, a request for a target location at which to meet with a vehicle. The system receives the target location and a planned passenger route for the passenger to the target location, which are calculated based on a location, facing direction, and direction of movement, if any, of the vehicle, and further calculated based on current and predicted traffic conditions, and wherein the target location is different from the first location, thereby facilitating optimization of a time duration and route the passenger takes to meet the vehicle.

In some embodiments, the system receives a planned driver route for the vehicle to the target location. In response to an action by the passenger or the vehicle, the system receives an updated target location, an updated planned passenger route, and an updated planned driver route, which are calculated based on an estimated time duration for the passenger and the vehicle to reach the updated target location.

In some embodiments, the action by the passenger or the vehicle includes one or more of: deviating from the planned passenger route or the planned driver route; and stopping or moving along the planned passenger route or the planned driver route for a period of time which alters by an algorithmically calculated amount the estimated time duration for the passenger or the vehicle to reach the target location.

In some embodiments, the system performs one or more of: displaying the target location, the planned passenger route, and the planned driver route on the first mobile computing device; displaying the target location, the planned passenger route, and the planned driver route on a second mobile computing device associated with the vehicle; displaying a current location of the passenger as the passenger travels to the target location; and displaying a current location of the vehicle as the vehicle travels to the target location.

In some embodiments, the target location, the planned passenger route, and a planned driver route for the vehicle to the target location are calculated further based on one or more of: map data retrieved from a central service; current and predicted traffic data retrieved from a central service; a profile for the passenger; a profile for the vehicle; a current location and a current direction of movement of the passenger; a current location and a current direction of movement of the vehicle; historical or real-time data associated with a geographical area including one or more of the target location, the first location of the passenger, a second location of the vehicle, the planned passenger route, the planned driver route, a current location of the passenger, a current location of the vehicle, current and predicted traffic patterns, information relating to climate or weather, and an obstacle or any object which affects the traffic behavior; and predictions based on the historical or the real-time data.

In some embodiments, the system determines a profile for the passenger based on the passenger's transportation preferences. The system determines ratings based on the profile for the passenger, wherein the ratings include one or more of: a health rating, which corresponds to a predetermined walking speed; a performance rating, which is based on a passenger-defined health goal and passenger walking performance in relation to the passenger-defined health goal; a climate tolerance rating, which indicates the passenger's willingness to walk a predetermined distance in a climate based on precipitation, wind, air temperature, or another climate-related factor; a mobility rating, which indicates the passenger's capacity for mobility; and one or more other ratings based on the profile for the passenger. The system analyzes the passenger's behavior and updates the ratings based on the analyzed behavior. The system includes the ratings in the profile for the passenger.

In some embodiments, the system determines a profile for the vehicle based on the vehicle's or its driver's transportation preferences. The system determines ratings based on the profile for the vehicle, wherein the ratings include one or more of: a fuel efficiency rating, which indicates a type of vehicle based on a consumption method, which corresponds to a predetermined average driving speed; a fuel efficiency goal rating, which indicates a desired level of fuel efficiency for the vehicle; a rider capacity rating, which indicates a maximum number of passengers to be carried by the vehicle;

a luggage capacity rating, which indicates a maximum number of bags to be carried by the vehicle; a luxury rating, which indicates a level of quality of the vehicle as related to an experience of a passenger of the vehicle; and one or more other ratings based on the profile for the vehicle. The system obtains information about the vehicle model based on manufacturer specifications for the vehicle model. The system analyzes the vehicle's behavior and updates the ratings based on the obtained information and the analyzed behavior. The system includes the ratings in the profile for the vehicle.

BRIEF DESCRIPTION OF THE FIGURES

In the figures, like reference numerals refer to the same figure elements.

DETAILED DESCRIPTION

Figure 1A:
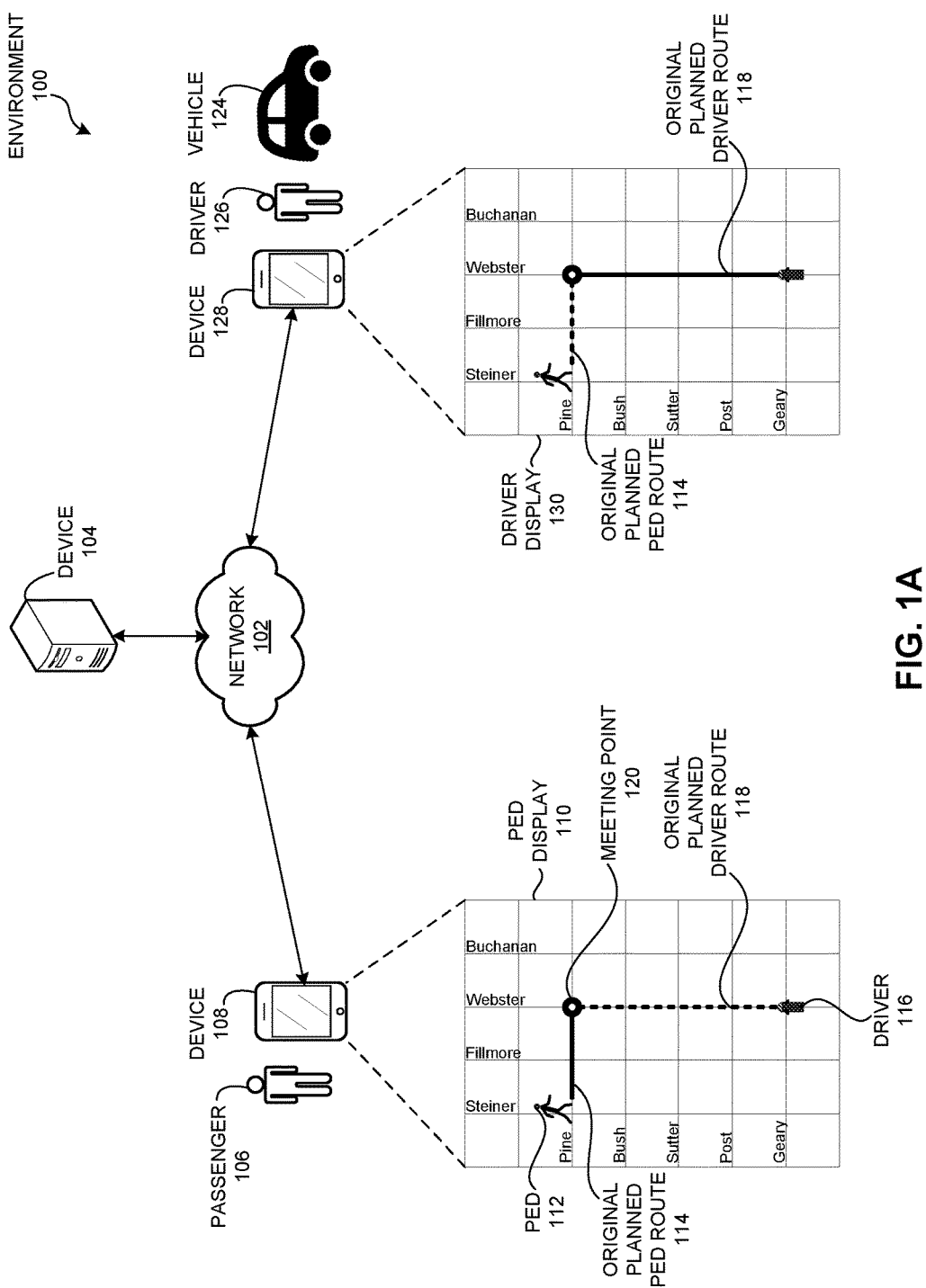
FIG. 1A illustrates an exemplary environment which facilitates optimization of passenger pick-up, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which determines a target location at which a passenger and a driver can meet, where the target location is different both from the passenger's initial location and a predetermined pick-up location. The system further allows both a passenger and a driver to dynamically respond to current traffic conditions while en route to the pick-up location.

In a typical on-demand ride service application, a (would-be) passenger can request a ride by providing the passenger's location, and an identified nearby vehicle can receive and respond to the request. The application can send an estimated time duration for the vehicle to arrive at the passenger's location. Some applications allow a passenger to request a "carpool" option, taking into account factors such as the final destination of multiple requesting passengers. Still other applications provide predetermined "hot-spot" pick-up locations, where multiple passengers may congregate and wait for a vehicle. These applications typically allow the passenger to view the location of the vehicle as the vehicle drives to the passenger's location or the predetermined pick-up location. So, the passenger can see the current and moving location of the vehicle while waiting for the vehicle at the passenger's location or while walking to the predetermined pick-up location.

If the vehicle encounters an unexpected traffic condition, the vehicle may need to take a more circuitous route to the passenger's location or the predetermined pick-up location. Upon seeing the vehicle's current and moving progress, and upon observing current traffic conditions in the passenger's realm of view, which includes what is visible around the passenger and what is displayed by the system, the passenger may realize that he can quickly reach the vehicle simply by, e.g., walking one block. However, current applications do not allow the passenger to inform the vehicle (or the driver of the vehicle) of a new pick-up location. Furthermore, current applications do not allow the vehicle to inform the passenger of a changed route or a new pick-up location based on current traffic conditions in the vehicle's realm of view, which includes what is visible around the driver and what is displayed by the system. In addition, current applications do not dynamically provide a pick-up location to the passenger and the vehicle that is different from both the passenger's initial location and a predetermined pick-up location.

Embodiments of the present invention solve these problems by providing a system which determines a target location that reduces delays and detours, optimizing on factors such as waiting time, distance, and accessibility, at which the passenger and the vehicle can meet, where the target location is different from the passenger's initial location. The passenger and the vehicle can receive the target location, a planned passenger route for the passenger to the target location, and a planned driver route for the vehicle to the target location. The system further allows the passenger and the driver to each dynamically respond to current traffic conditions, which causes the system to recalculate the target location. It can also respond to system-sensed current and predicted traffic conditions to recalculate an optimal target meeting location. The passenger and the vehicle can subsequently receive respective updated routes to an updated target location, as described below in relation to FIGS. 1A, 1B, and 1C. The present system can also display a notification message when an "en-route action" by the passenger or the vehicle causes the system to determine an updated target location. The system can determine the updated target location based on various factors, such as live map and traffic data, road words, accidents, hazards, traffic lights, and weather retrieved from a central service (e.g., Waze or GoogleMaps), or historical data patterns associated with the corresponding geographic area which can enable predictions to be made about upcoming dynamic changes in traffic patterns. Furthermore, the system can determine the updated target location based on a profile for the passenger or the vehicle, as described below in relation to FIGS. 4A and 4B.

Thus, embodiments of the present invention provide a system which improves passenger pick-up via an on-demand ride service application, where the improvements are fundamentally technological. The system provides a technological solution (e.g., using an application which provides an initial pick-up location, allows both the passenger and the driver to dynamically respond to current traffic conditions, determines a new pick-up location, and re-directs the passenger and the driver to the new pick-up location) to the technological problem of the efficient and effective scheduling of passenger pick-up via an on-demand ride service application.

The following terms are used in this disclosure:

The term "passenger" refers to a person who requests a ride (e.g., requests a target location at which to meet with a vehicle). A passenger can request a ride via an on-demand ride service application on a mobile computing device. Technically, a "passenger" is a would-be or potential passenger seeking a ride, who upon entering the vehicle, becomes an actual passenger. However, for purposes of this disclosure, a passenger is a person requesting a ride from a dynamically determined pick-up location. A passenger can be a pedestrian (i.e., willing to walk to a target location) or simply a person who waits for a driver at a fixed location. The terms "passenger" and "pedestrian" are used interchangeably in this disclosure. A passenger can request a ride via a mobile computing device, and receive the following information to be displayed on the passenger's mobile computing device: the target location; the passenger's route to the target location; the vehicle's route to the target location; and the current location of the passenger and the vehicle. A subsequent action by the passenger, or the vehicle, or the system responding to current sensed conditions, which changes a respective route can result in the passenger receiving the following additional information to be displayed on the passenger's mobile computing device: an updated target location; the passenger's updated route to the updated target location; the vehicle's updated route to the updated target location; and the current location of the passenger and the vehicle.

The term "vehicle" refers to a vehicle which may provide the requested ride to the passenger. A vehicle may have an associated "driver," or, in the case of a driverless vehicle, may have an associated autonomous navigation system that performs all the actions of the driver described in this disclosure. The terms "vehicle" and "driver" are used interchangeably in this disclosure. A vehicle or a driver may have an associated mobile computing device, which may be voice activated and/or mounted in the vehicle for ease of display and to comply with hands-free laws and other safety regulations regarding usage of mobile computing devices while inside a moving vehicle.

The term "driver" can refer to a system user who is inside of a vehicle and responds to a request for a ride from a passenger via an on-demand ride service application or to an autonomous navigation system that performs all the tasks of a driver.

The term "passenger" refers to a user of the system who requests a ride from it. In some embodiments, multiple passengers may request a ride, and a single driver or vehicle may respond to such requests.

The term "target location" refers to a meeting point or passenger pick-up location, as dynamically determined by the system.

The term "route" refers to a path from a first location to a second location. The term "en route" refers to the state of traveling to a specified location.

The term "action" refers to a dynamic response or by a passenger or a vehicle while en route to a target location. Exemplary "en-route actions" are described below.

Exemplary Network and Communication

FIG. 1A illustrates an exemplary environment 100 which facilitates optimization of passenger pick-up, in accordance with an embodiment of the present invention. Environment 100 can include a computer network 102. Environment 100 can also include: computing devices 104, 108, and 128; a passenger 106 associated with device 108; and a driver 126 and a vehicle 124, which are both associated with device 128. Device 104 can be a server, a content-hosting device, a central service with map data, or any other computing device. Devices 108 and 128 can be a mobile computing device, a smartphone, a laptop, a tablet, a computer, or any other computing device. Device 108 may or may not be a device separate from vehicle 124, and vehicle 124 may include associated driver 126, or driver 126 can represent an autonomous navigation system performing tasks roughly equivalent to those of a human driver.

Device 108 can include a pedestrian display 110, which is a map that identifies: passenger 106 as a pedestrian 112; driver 126 and/or vehicle 124 as a driver 116; a target location or a meeting point 120; an original planned pedestrian route 114 for pedestrian 112 to meeting point 120; and an original planned driver route 118 for driver 116 to meeting point 120. Planned pedestrian route 114 can include a predictable means of conveyance for the pedestrian, such as an escalator, a moving walkway, a trolley, or a bus. Device 128 can include a driver display 130, which is a similar map as the map on pedestrian display 110.

Passenger 106 can be a passenger that requests a ride via an on-demand ride service application, and driver 126 can respond to the request for a ride via the on-demand ride service application. Device 108 can generate a request for a target location at which to meet with a vehicle. The request can be sent over network 102 and processed by device 104. Based on various factors, device 104 can identify a vehicle which is to respond to the request, and return a target location and a route for passenger 106 to the target location. The various factors can include, e.g.: the location of the requesting passenger (e.g., passenger 106); the location and direction of movement of the identified vehicle (e.g., vehicle 124); map data (stored in device 104 or retrieved by device 104 from another device or devices); passenger information in a profile for passenger 106; and historical or real-time data associated with the pertinent geographic area (e.g., the area shown in pedestrian display 110).

The system can identify the vehicle which is to respond to the request based on these various factors, including the location and direction of movement of the identified vehicle. Consider a Vehicle A at a certain location that is 5 blocks from the requesting passenger and also moving in a direction more direct to the passenger's location or a potential meeting point. Further consider a Vehicle B which is at a closer location than Vehicle A from the requesting passenger (e.g., 3 blocks), but is moving in a direction that is less direct than Vehicle A's movement of direction to the passenger's location or potential meeting point. For example, Vehicle B may also be on a one-way street, or on a busy street on which U-turns are either illegal or known to be difficult (as determined by previously gathered historical data, including traffic conditions, congestion, etc.). In this case, the system may identify Vehicle A over Vehicle B, based on both the location and direction of movement of Vehicle A. Also, an identified vehicle does not necessarily need to be moving. An identified vehicle may simply be facing a certain direction, e.g., parked on a side of the road that is determined to be more optimal given the other factors.

During operation, passenger 106 can request a ride while standing at the corner of Pine and Steiner. The system (via network 102 and, e.g., device 104) can return, and device 108 can receive and display, the following: the current location of pedestrian 112 at Pine and Steiner; a target location for meeting point 120 at Webster and Pine; and original planned pedestrian route 114 to meeting point 120. The system can also return, and device 108 can also receive and display: the current location of driver 116 at Geary and Webster; and original planned driver route 118 to meeting point 120. The system can further display the current and moving location of both pedestrian 112 and driver 116 while each is en route to meeting point 120.

In some embodiments, the route of the viewing user appears as one color or pattern (such as the solid line for original planned pedestrian route 114 on pedestrian display 110, and the solid line for original planned driver route 118 on driver display 130), while the route of the other user appears as a different color or pattern (such as the dotted line for original planned driver route 118 on pedestrian display 110, and the dotted line for original planned pedestrian route 114 on driver display 130).

Thus, the system dynamically determines a target location (e.g., meeting point 120) at which the requesting passenger (e.g., passenger 106 displayed as pedestrian 112 on pedestrian display 110) is to meet the identified vehicle (e.g., vehicle 124 displayed as driver 116 on pedestrian display 110). This dynamic determination is made based on the location of the requesting passenger, the location, facing direction, and direction of movement, if any, of the vehicle, and the various factors described above.

Dynamic Response to En-Route Actions by a Passenger or a Vehicle

The system can dynamically respond to actions taken by the passenger and the vehicle while en route to the meeting point. The system can dynamically update the target location and provide to both the passenger and the vehicle updated routes to the updated meeting point, in response to such an "en-route action" by either the passenger or the vehicle.

An exemplary en-route action can include the passenger or the vehicle deviating from their respective planned route to the meeting point triggering recalculation of the target location and recalculation and updating of the pedestrian and driver routes. Another exemplary en-route action can include the passenger or the vehicle stopping or moving along their respective planned route for a period of time which alters (by a predetermined amount or by an algorithmically calculated amount) the estimated time duration for the passenger or vehicle to reach the target location.

Figure 1B:
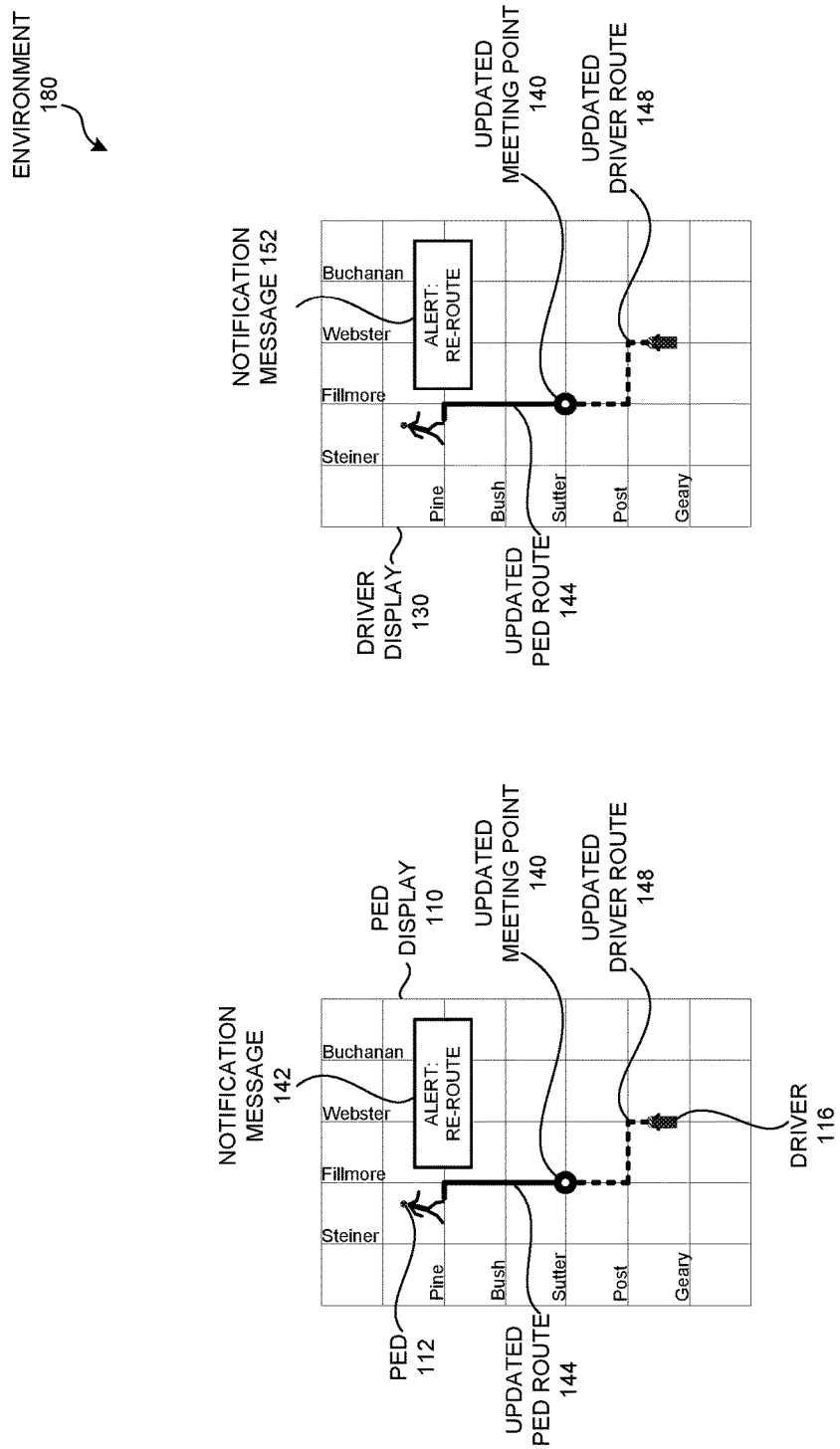
FIG. 1B illustrates an exemplary environment which facilitates optimization of passenger pick-up, including a dynamic response by a passenger or a vehicle, or the system itself in response to current conditions, in accordance with an embodiment of the present invention.

FIG. 1B illustrates an exemplary environment 180 which facilitates optimization of passenger pick-up, including a dynamic response by a passenger or a vehicle, or the system itself in response to current conditions, in accordance with an embodiment of the present invention. Environment 180 corresponds to environment 100 of FIG. 1A, and includes only pedestrian display 110 and driver display 130 for the sake of illustration. Displays 110 and 130 of FIG. 1B reflect the system at a time subsequent to the actions described in FIG. 1A. References to driver 116 represent driver 126 of vehicle 124, and references to pedestrian 112 represent passenger 106.

While driver 116 is en route to meeting point 120, driver 116 may encounter an unexpected traffic condition, such as a malfunctioning traffic light, or a police blockaded road closure, or a large tractor trailer blocking an intersection. Driver 116 may decide to deviate from original driver route 118 and make a left turn at Post. Alternatively, while pedestrian 112 is en route to meeting point 120, pedestrian 112 may observe a street closure at Fillmore and Pine. Pedestrian 112 may decide to deviate from original planned pedestrian route 114 and instead make a right turn on Fillmore. Alternatively, device 104 may receive similar kinds of data such as a report of a build-up of traffic, which causes it to change its predictions about travel times for the planned pedestrian route or the planned driver route.

Based on any of these actions by the driver, the pedestrian, or the system's device 104, the system can recalculate the meeting point, and send a notification message to both the pedestrian and the driver. The message can be displayed as a notification message 142 on pedestrian display 110, and a notification message 152 on driver display 130. Furthermore, the system can send, and device 108 can receive and display on pedestrian display 110, the following information: an updated meeting point 140 at Fillmore and Sutter; an updated pedestrian route 144 to updated meeting point 140; and an updated driver route 148 to updated meeting point 140. As in FIG. 1A, the system can also display the current and moving location of both pedestrian 112 and driver 116 while each is en route to updated meeting point 140.

Figure 1C:
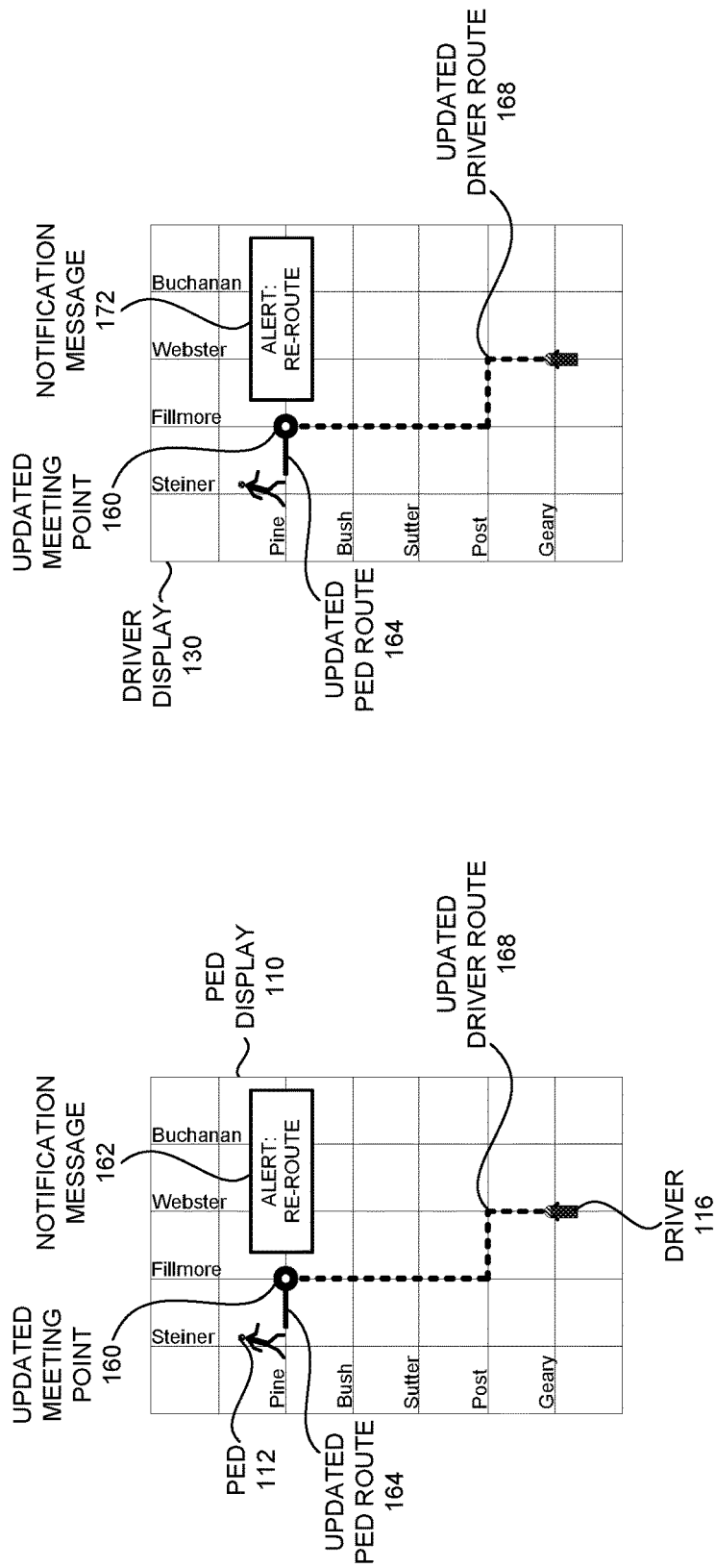
FIG. 1C illustrates an exemplary environment which facilitates optimization of passenger pick-up, including a dynamic response by a passenger, in accordance with an embodiment of the present invention.

FIG. 1C illustrates an exemplary environment 190 which facilitates optimization of passenger pick-up, including a dynamic response by a passenger, in accordance with an embodiment of the present invention. Environment 190 corresponds to environment 100 of FIG. 1A, and includes only pedestrian display 110 and driver display 130 for the sake of illustration. Displays 110 and 130 of FIG. 1C reflect the system at a time subsequent to the actions described in FIG. 1A.

While pedestrian 112 is en route to meeting point 120, pedestrian 112 may stop to give directions to a passerby, or take some other action which slows him down and alters the estimated time duration of pedestrian 112 to meeting point 120.

Based on this action by the pedestrian, the system can recalculate the meeting point, and send a notification message to both the pedestrian and the driver. The message can be displayed as a notification message 162 on pedestrian display 110, and a notification message 172 on driver display 130. Furthermore, the system can send, and device 108 can receive and display on pedestrian display 110, the following information: an updated meeting point 160 at Fillmore and Pine; an updated pedestrian route 164 to updated meeting point 160; and an updated driver route 168 to updated meeting point 160. As in FIG. 1A, the system can also display the current and moving location of both pedestrian 112 and driver 116 while each is en route to updated meeting point 160.

Thus, the system can dynamically respond to actions taken by either the passenger or the driver while en route to the meeting point, by taking into account the various factors described above.

A Passenger Profile

A passenger can create a passenger profile, and enter in the passenger's transportation preferences. The system can determine the passenger's profile based on the passenger's transportation preferences by providing a series of questions with discrete responses (e.g., Yes/No, Mild/Moderate/Severe, or a range of numbers such as 1 to 10) in a variety of areas. The system can use these responses to generate ratings for each area, and use the generated ratings to calculate a requested or updated meeting point. For example, the areas can include health and fitness goals. The system can generate a health rating based on the passenger's responses to questions regarding the passenger's general health, e.g., smoker/non-smoker, number of times exercise per week, method of transportation to work, average number of minutes or miles walked day, etc. The health rating can correspond to a predetermined walking speed.

The system can also generate a fitness goal rating based on the passenger's responses to questions regarding the passenger's desired fitness goals, e.g., a desired number of steps to be taken per day or other time period, a desired number of calories to be burnt per day or other time period, and a maximum or minimum elevation gain to be reached per day or other time period. The other time period can be a discrete time period such as a day or several hours, or by an event-based time period, such as a trip or a completed route. The fitness goal rating can track the passenger's fitness goal against the passenger's actual fitness performance (e.g., similar to a FitBit or other heath-tracking application or device). The fitness goal rating can also be a performance rating, which is based on a passenger-defined health goal and passenger walking performance in relation to the passenger-defined health goal.

Other areas of the passenger's profile can include climate tolerance and mobility preferences. The system can generate a climate tolerance rating based on the passenger's responses to questions regarding the passenger's preferences on climate, e.g., willingness to walk a certain distance during mild/moderate/heavy rain or wind, and willingness to walk when the temperature is in a certain range or when the temperature is below or above a certain temperature. The climate tolerance rating can also take into account (via the passenger's responses to other questions) other climate-related features such as the passenger's tolerance to wind, wind chill, wind direction, precipitation, humidity, pressure of a weather system, etc.

The system can also generate a mobility rating based on the passenger's responses to questions regarding the passenger's mobility, e.g., full mobility, moderate mobility, limited mobility on foot, severely limited mobility and using an automated mobile wheelchair-like device, severely limited mobility and using a manual mobile wheelchair-like device. The mobility rating can also take into account (via the passenger's responses to other questions) other mobility-related factors, such as: a visual or hearing impairment; a communication, learning, or mental health disability; an emotional or cognitive disability; and any other physical disability or health condition. The mobility rating may be part of the health rating or the fitness rating, or can be a separate rating which may change over time. For example, if the passenger experiences a temporary (and recoverable) physical disability (such as breaking a leg) and enters this information in response to the questions regarding the passenger's mobility, the system may automatically change the passenger's health rating or fitness goal rating based on the temporary physical disability, or the system may prompt the passenger for updated health information and fitness goals.

The passenger's profile can also include other areas. When the passenger provides responses to questions related to those other areas, the system can determine additional ratings to be used in calculating a target location. For example, other areas can include the type of footwear worn, the urgency of the request for the ride, a willingness to walk a greater distance, and a willingness to wait a longer amount of time, etc.

A passenger can enter this information either during creation of the passenger's profile, or at any time, e.g., prior to requesting a ride. Thus, upon profile creation, the passenger can provide a "Yes" or a "High" answer or rating to the "willingness to walk in heavy wind" question, but the passenger can change that answer to a "No" when faced with an actual heavy wind condition prior to requesting a ride. This may cause the system to calculate a meeting point that is either at the passenger's initial location or is significantly closer to the passenger's initial location than a meeting point calculated based on a "Yes" or "High" answer or rating The system can use the generated ratings to calculate the initial meeting point or an updated meeting point. The system can also increase or decrease a passenger's score (or increase or decrease a number of points representing the passenger's score) based on, e.g.: changing responses in the passenger's profile before a trip; completing or not completing a trip (i.e., arriving at a first, second, or other updated meeting point); and arriving at a meeting point earlier or later than the estimated time duration calculated for that route.

A Vehicle Profile

Just as a passenger can create a user profile, a driver can create a vehicle profile, some or all of which may or may not be contributed to by passengers or automatically filled in based on manufacturer specifications for the vehicle model. The system can determine the vehicle's profile based on the vehicle's transportation preferences, and can further determine ratings in various areas. For example, the areas can include fuel efficiency and a fuel efficiency goal. The system can generate a fuel efficiency rating, which indicates a type of vehicle based on a consumption method (e.g., fuel, electric, solar, hybrid, or other combination), which can correspond to a predetermined average driving speed. The system can also generate a fuel efficiency goal rating based on a desired level of fuel efficiency for the vehicle. The fuel efficiency goal rating can also track the vehicle's fuel efficiency goal against the vehicle's actual fuel consumption or efficiency.

The system can also record a rider capacity and a luggage capacity rating. The rider capacity rating can indicate a maximum number of passengers to be carried by the vehicle, and the luggage capacity rating can indicate a maximum number of bags to be carried by the vehicle.

In addition, the system can record a luxury rating, which can indicate a level of quality of the vehicle as related to an experience of a passenger of the vehicle. Some features which can increase a luxury rating can include additional leg room, a greater than average luggage capacity, a leather interior, fixtures made of precious metals, automated or voice-activated doors, smoothness of ride, and a noise-free interior.

The vehicle's profile can also include other areas, such as RPM of the engine, passenger-controlled radio, passenger amenities included in the ride (e.g., newspaper, fresh towel, refreshments), and in-seat entertainment.

The system can record ratings and subsequently use the generated ratings to both identify the vehicle and calculate the initial meeting point or an updated meeting point. The system can also increase or decrease a vehicle's score (or increase or decrease a number of points representing the vehicle's score) based on, e.g.: changing answers in the vehicle's profile before a trip (e.g., decreasing an amount of amenities); completing or not completing a trip (i.e., arriving at a first, second, or other updated meeting point); and arriving at a meeting point earlier or later than the estimated time duration calculated for that route.

Method for Facilitating Optimization of Passenger Pick-Up

Figure 2:
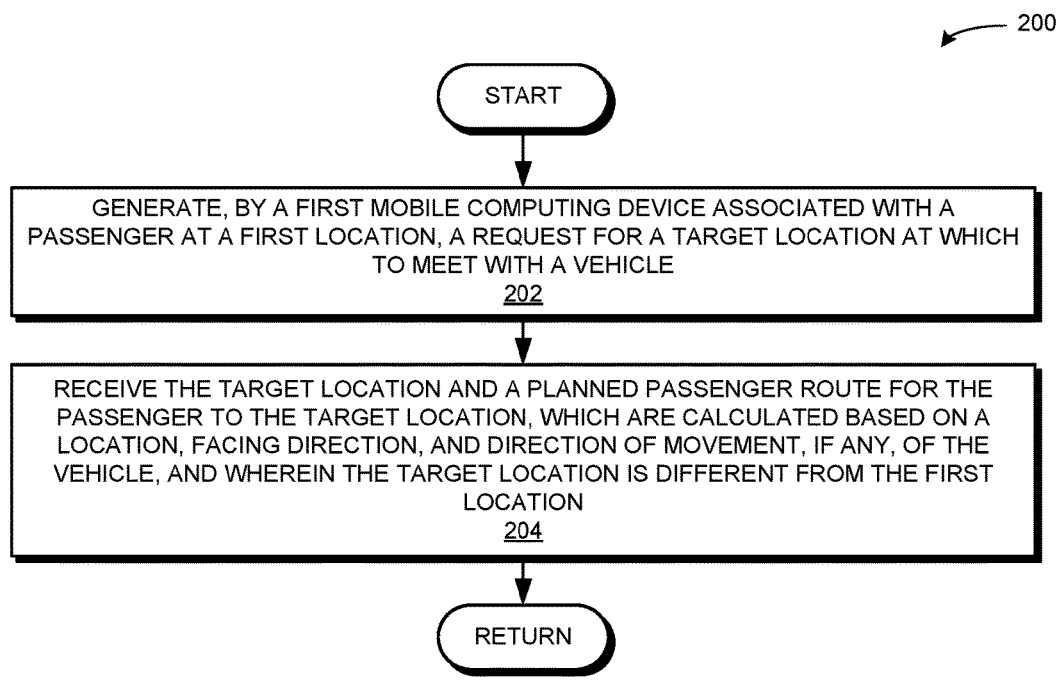
FIG. 2 presents a flow chart illustrating a method for facilitating optimization of passenger pick-up, in accordance with an embodiment of the present invention.

FIG. 2 presents a flow chart 200 illustrating a method for facilitating optimization of passenger pick-up, in accordance with an embodiment of the present invention. During operation, the system generates, by a first mobile computing device associated with a passenger at a first location, a request for a target location at which to meet with a vehicle (operation 202). The system receives the target location and a planned passenger route for the passenger to the target location, which are calculated based on a location, facing direction, and direction of movement, if any, of the vehicle, and wherein the target location is different from the first location (operation 204).

Figure 3:
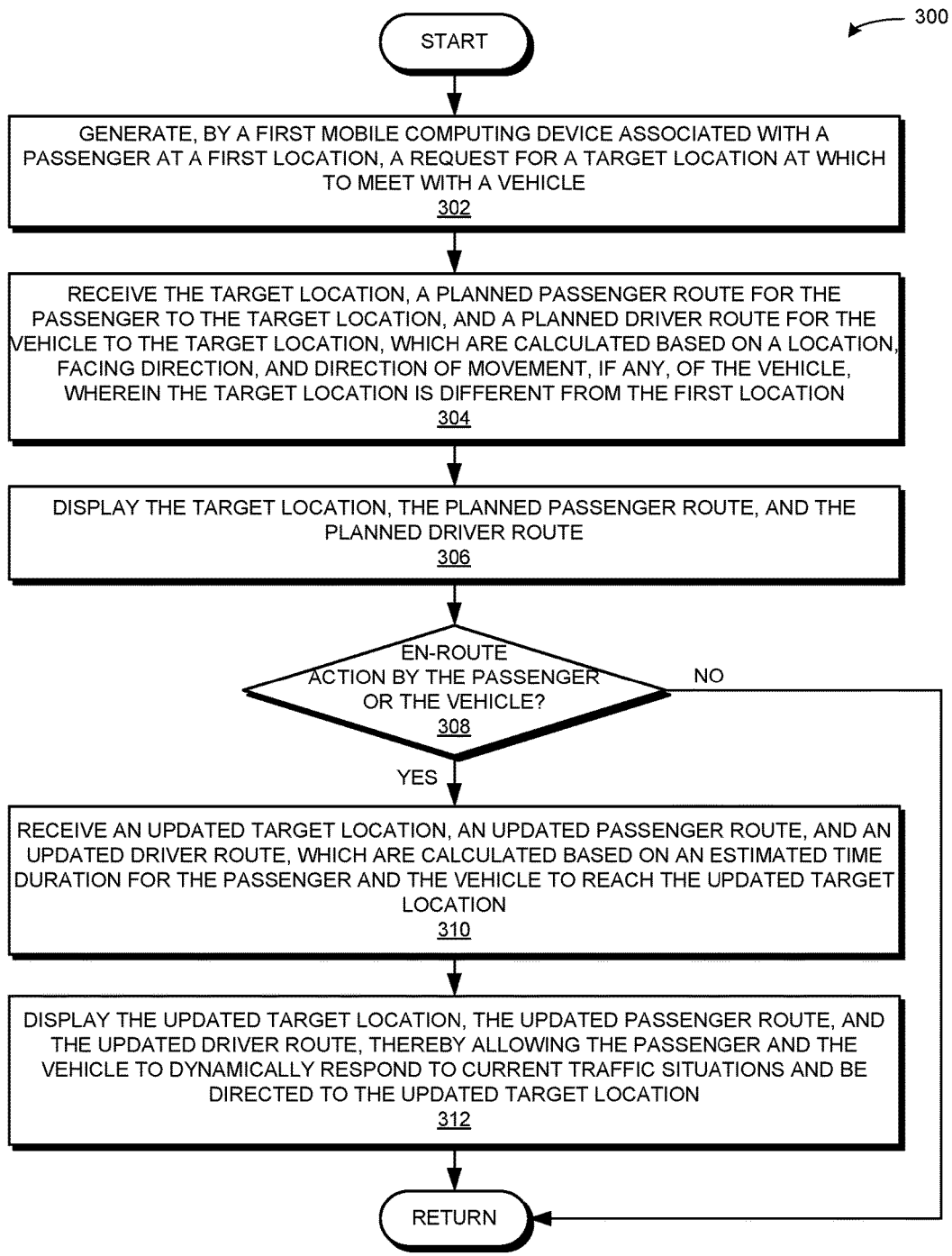
FIG. 3 presents a flow chart illustrating a method for facilitating optimization of passenger pick-up, including dynamically responding to an action by a passenger or a vehicle, in accordance with an embodiment of the present invention.

FIG. 3 presents a flow chart 300 illustrating a method for facilitating optimization of passenger pick-up, including dynamically responding to an action by a passenger or a vehicle, in accordance with an embodiment of the present invention. During operation, the system generates, by a first mobile computing device associated with a passenger at a first location, a request for a target location at which to meet with a vehicle (operation 302). The system receives the target location, a planned passenger route for the passenger to the target location, and a planned driver route for the vehicle to the target location, which are calculated based on a location, facing direction, and direction of movement, if any, of the vehicle, and wherein the target location is different from the first location (operation 304). As discussed above, the target location, the planned passenger route, and the planned driver route may be calculated further based on map data, a profile of the passenger or the vehicle, a current location or direction of movement of the passenger or the vehicle, and historical or real-time data or predictions associated with the corresponding geographical area. The system displays the target location, the planned passenger route, and the planned driver route (operation 306), on the first mobile computing device. The system can also display the target location, the planned passenger route, and the planned driver route on a second mobile computing device associated with the vehicle.

If the system does not determine an en-route action by the passenger or the vehicle (decision 308), the operation returns. If the system does determine an en-route action by the passenger or the vehicle (decision 308), the system receives an updated target location, an updated passenger route, and an updated driver route, which are calculated based on an estimated time duration for the passenger and the vehicle to reach the updated target location (operation 310). The updated target location, updated passenger route, and updated driver route may be calculated further based on the various factors, as described above in relation to operation 304. The system displays the updated target location, the updated passenger route, and the updated driver route, thereby allowing the passenger and the vehicle to dynamically respond to current traffic conditions and be directed to the updated target location (operation 312).

Facilitating Optimization of Passenger Pick-Up Based on a Passenger Profile

Figure 4A:
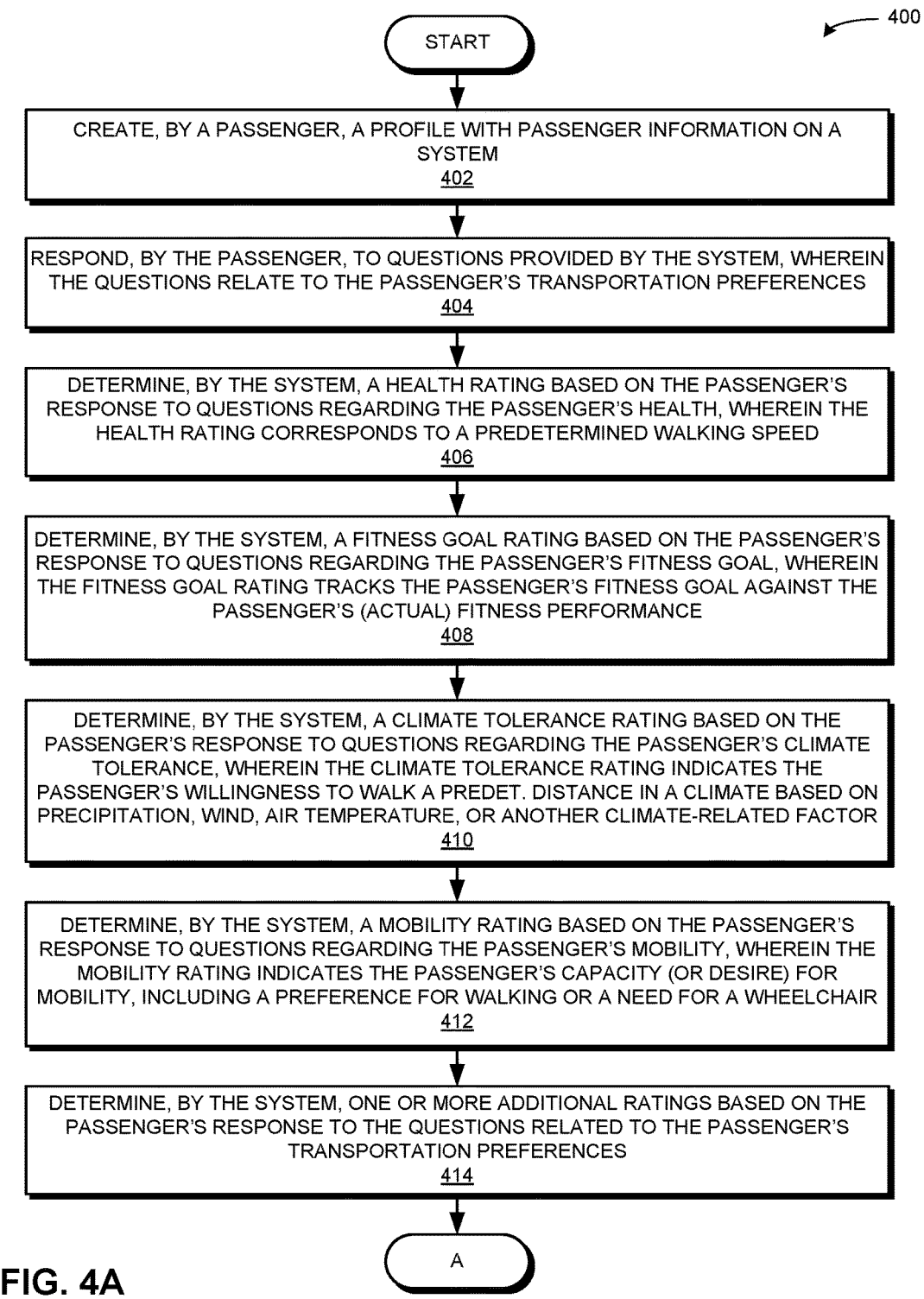
FIG. 4A presents a flow chart illustrating a method for creating a profile and determining ratings based on the profile, in accordance with an embodiment of the present invention.

FIG. 4A presents a flow chart 400 illustrating a method for creating a profile and determining ratings based on the profile, in accordance with an embodiment of the present invention. During operation, the system determines a profile for the passenger based on the passenger's transportation preferences. For example, a passenger creates a profile with passenger information on a system (operation 402). The passenger responds to questions provided by the system, wherein the questions relate to the passenger's transportation preferences (operation 404). The preferences can include areas as described above, including health, fitness goals, climate tolerance, and mobility. The system can determine a health rating based on the passenger's response to questions regarding the passenger's health, wherein the health rating corresponds to a predetermined walking speed (operation 406). The system can determine a fitness goal rating based on the passenger's response to questions regarding the passenger's fitness goal, wherein the fitness goal rating tracks the passenger's fitness goal against the passenger's (actual) fitness performance (operation 408). The system can determine a climate tolerance rating based on the passenger's response to questions regarding the passenger's climate tolerance, wherein the tolerance rating indicates the passenger's willingness to walk a predetermined distance in a climate based on precipitation, wind, air temperature, or another climate-related factor (operation 410). The system can determine a mobility rating based on the passenger's response to questions regarding the passenger's mobility, wherein the mobility rating indicates the passenger's capacity or desire for mobility, including a preference for walking or a need for a wheelchair (operation 412). The system can also determine one or more additional ratings based on the passenger's response to the questions related to the passenger's transportation preferences (operation 414). The operation continues as described at Label A of FIG. 4B.

Figure 4B:
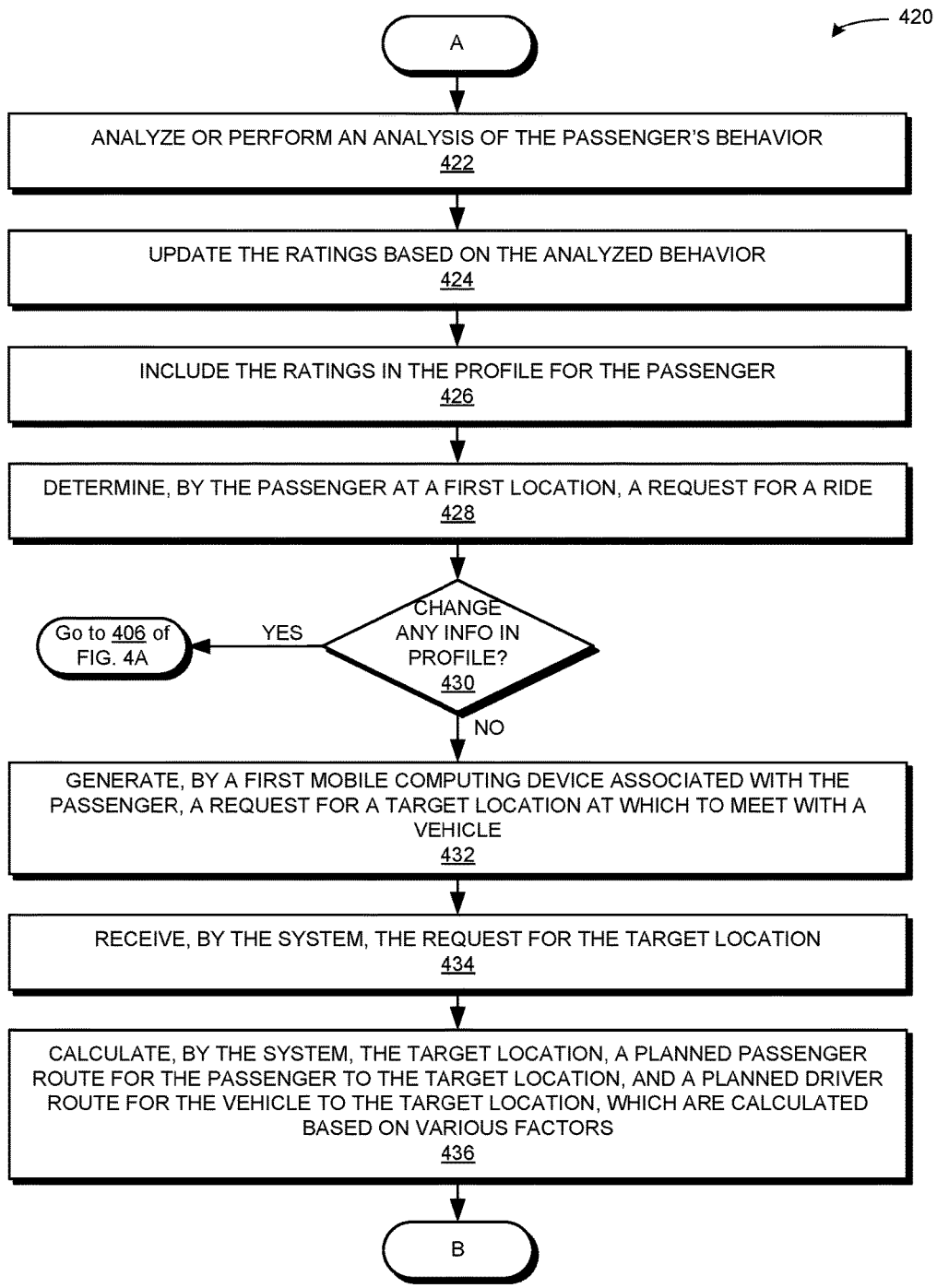
FIG. 4B presents a flow chart illustrating a method for facilitating optimization of passenger pick-up, including dynamically responding to changes in a profile, in accordance with an embodiment of the present invention.

FIG. 4B presents a flow chart 420 illustrating a method for facilitating optimization of passenger pick-up, including dynamically responding to changes in a profile, in accordance with an embodiment of the present invention. During operation, the system analyzes the passenger's behavior (e.g., by observing and learning from the passenger's behavior over a given period of time) (operation 422), and updates the ratings based on the analyzed behavior (operation 424). The system includes the ratings in the profile for the passenger (operation 426). The system determines, by the passenger at a first location, a request for a ride (operation 428). If the passenger changes any information in his profile (decision 430), the operation continues as described at operations 406-414 of FIG. 4A (i.e., the system can calculate the ratings based on the passenger's changed responses to the questions).

If the passenger does not change any information in his profile (decision 430), the system generates, by a first mobile computing device associated with the passenger, a request for a target location at which to meet with a vehicle (operation 432). The system receives the request for the target location (operation 434). The system calculates the target location, a planned passenger route for the passenger to the target location, and a planned driver route for the vehicle to the target location, which are calculated based on various factors (operation 436). As described above, the various factors can include map data, the passenger's profile, the vehicle's profile, a current location or direction of movement of the passenger or the vehicle, and historical or real-time data or predictions associated with the relevant geographical area. Furthermore, calculating the target location, the planned passenger route, and the planned driver route can include identifying a vehicle based on a location, facing direction, and movement of direction, if any, of the vehicle. The operation continues as described at Label B of FIG. 4C.

Figure 4C:
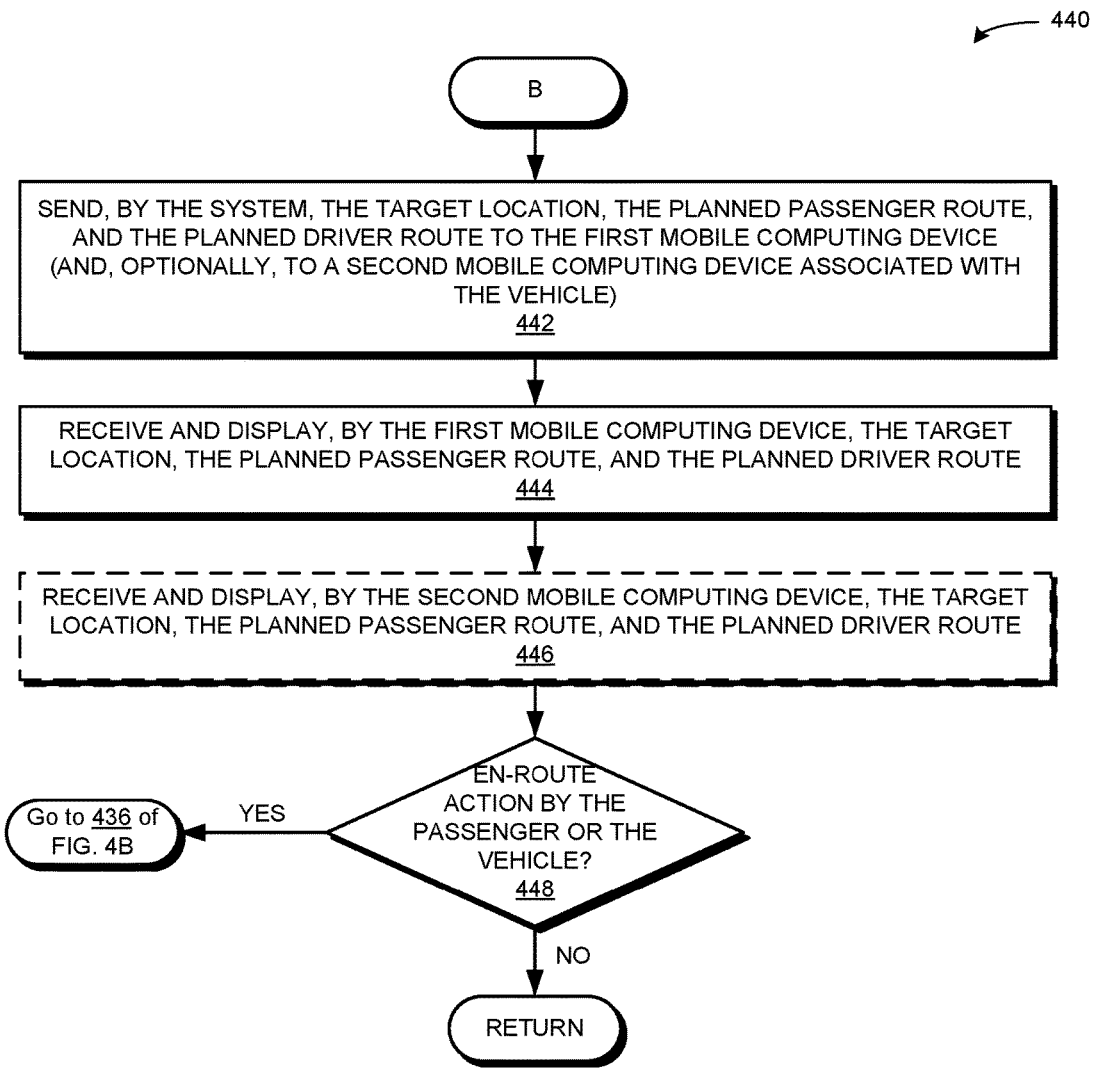
FIG. 4C presents a flow chart illustrating a method for facilitating optimization of passenger pick-up, including dynamically responding to an en-route action by a passenger or a vehicle, in accordance with an embodiment of the present invention.

FIG. 4C presents a flow chart 440 illustrating a method for facilitating optimization of passenger pick-up, including dynamically responding to an en-route action by a passenger or a vehicle, in accordance with an embodiment of the present invention. The system sends the target location, the planned passenger route, and the planned driver route to the first mobile computing device (and, optionally, to a second mobile computing device associated with the vehicle) (operation 442). Note that the vehicle may be a driverless vehicle, which may or may not include the second mobile computing device inside the vehicle. The first mobile computing device receives and displays the target location, the planned passenger route, and the planned driver route (operation 444). Optionally, the second mobile computing device receives and displays the target location, the planned passenger route, and the planned driver route (operation 446).

If the system does not determine an en-route action by the passenger or the vehicle (decision 448, similar to decision 308 of FIG. 3A), the operation returns. If the system does determine an en-route action by the passenger or the vehicle (decision 448), the system calculates the target location, the planned passenger route, and the planned driver route (operation 436 of FIG. 4B), again based on various factors. That is, the system recalculates the target location, the planned passenger route, and the planned driver route as the updated target location, the updated passenger route, and the updated driver route, as described in relation to operations 310 and 312 of FIG. 3. The operation then continues as described above for operations 442-448.

Note that while the operations described in FIGS. 4A, 4B, and 4C relate to a profile for a passenger, similar operations may occur with respect to a profile for a vehicle. For example, the system can determine a vehicle profile, determine ratings based on the vehicle profile, and include the ratings in the vehicle profile. Furthermore, the system can obtain information about the vehicle model based on manufacturer specifications for the vehicle model, and analyze the vehicle's behavior (e.g., by observing and learning from the vehicle's behavior over a given period of time). The system can update the ratings based on the obtained information and the analyzed behavior, and can include the ratings in the vehicle profile. During operation, an identified vehicle may change responses (or update information) in its vehicle profile, and the updated information may be used by the system to calculate (or re-calculate) a target location, a planned passenger route, and a planned driver route.

Exemplary Device and Computer System

Figure 5:
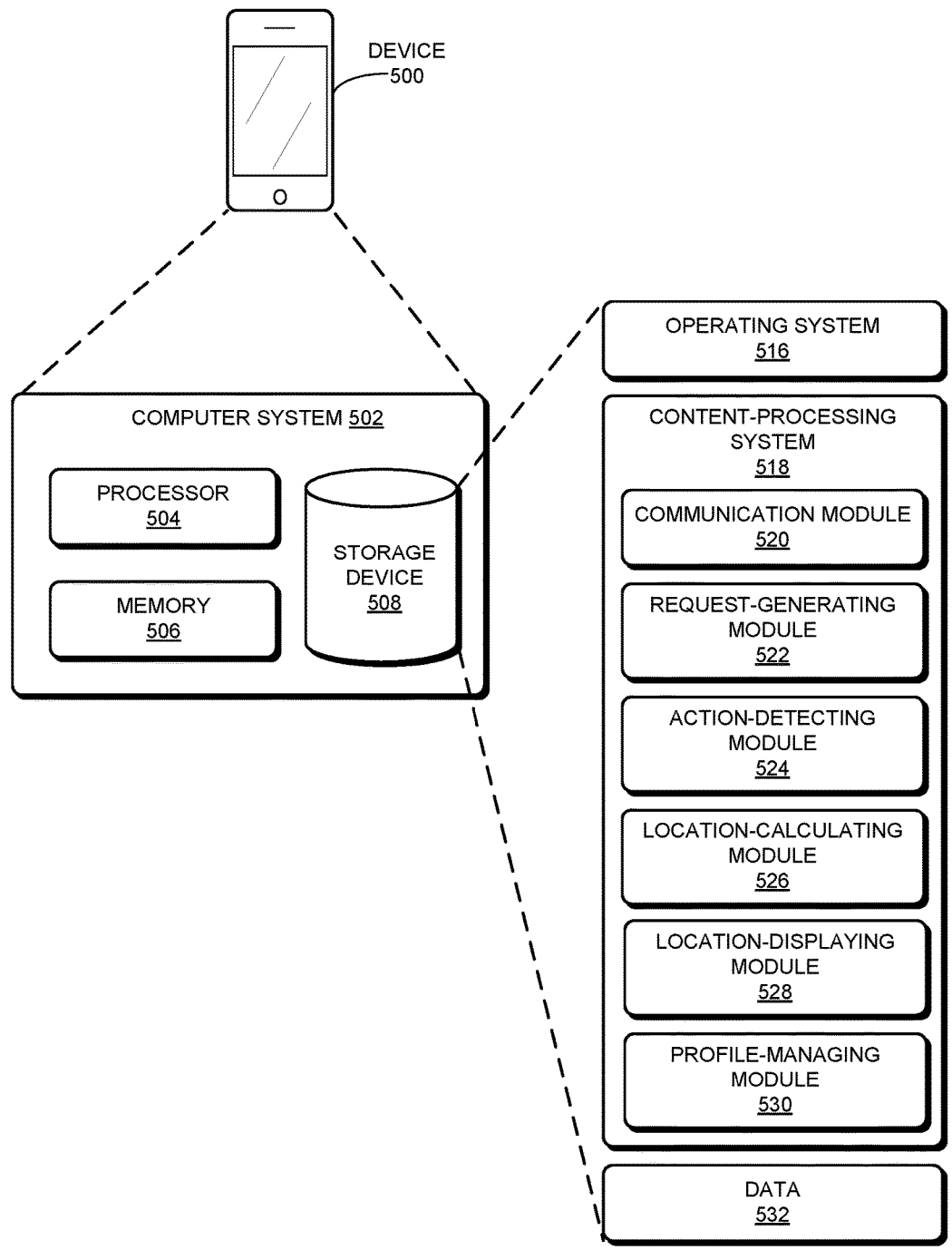
FIG. 5 illustrates an exemplary computer system that facilitates optimization of passenger pick-up, in accordance with an embodiment of the present invention.

FIG. 5 illustrates an exemplary device 500 and computer system 502 that facilitates optimization of passenger pick-up, in accordance with an embodiment of the present invention. Device 500 can include computer system 502, which includes a processor 504, a memory 506, and a storage device 508. Memory 506 can include a volatile memory (e.g., RAM) that serves as a managed memory, and can be used to store one or more memory pools. Device 500 can be a personal smartphone, a mobile phone, a tablet, a three-dimensional viewing glass, or any other mobile computing device. Storage device 508 can store an operating system 516, a content-processing system 518, and data 532.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network or within a network node itself (communication module 520). Content-processing system 518 can include instructions for generating, by a first mobile computing device associated with a passenger at a first location, a request for a target location at which to meet with a vehicle (request-generating module 522). Content-processing system 518 can include instructions for receiving the target location and a planned passenger route for the passenger to the target location, which are calculated based on a location, facing direction, and direction of movement, if any, of the vehicle, and wherein the target location is different from the first location (communication module 520 and location-calculating module 526).

Content-processing system 518 also can include instructions for receiving a planned passenger route for the vehicle to the target location (communication module 520 and location-calculating module 526). Content-processing system 518 can include instructions for, in response to an action by the passenger or the vehicle or by the system itself in response to current conditions or dynamic traffic conditions (action-detecting module 524), receiving an updated target location, an updated passenger route, and an updated driver route, which are calculated based on an estimated time duration for the passenger and the vehicle to reach the updated target location (communication module 520 and location-calculating module 526).

Furthermore, content-processing system 518 can include instructions for displaying the target location, the planned passenger route, and the planned driver route on the first mobile computing device or on a second mobile computing device associated with the vehicle (location-displaying module 528). Content-processing system 518 can also include instructions for displaying a current location of the passenger as the passenger travels to the target location or a current location of the vehicle as the vehicle travels to the target location (location-displaying module 528).

Content-processing system 518 can additionally include instructions for determining a profile for the passenger based on the passenger's transportation preferences, determining ratings based on the profile for the passenger, and including the ratings in the profile for the passenger (profile-managing module 530). Content-processing system 518 can also include instructions for updating the passenger profile and ratings automatically, based on observing and learning from the passenger's behavior (profile-managing module 530). Content-processing system 518 can include instructions for determining a profile for the vehicle based on the vehicle's transportation preferences, determining ratings based on the profile for the vehicle, and including the ratings in the profile for the vehicle (profile-managing module 530). Content-processing system 518 can also include instructions for updating the vehicle profile and ratings automatically, based on observing and learning from the driver's or vehicle's behavior, and on obtaining information about the vehicle model from manufacturer specifications (profile-managing module 530).

Data 532 can include any data that is required as input or that is generated as output by the methods and/or processes described in this disclosure. Specifically, data 532 can store at least: a request; a request for a target location; a target location; an updated target location; a route; a planned passenger route for a passenger to the target location; a planned driver route for a vehicle to the target location; an updated passenger route; an updated driver route; a location, facing direction, and direction of movement of a vehicle or a passenger; a current location of a passenger or a vehicle; an estimated time duration for a passenger and a vehicle to reach a target location; an action by a passenger or a vehicle; an action which includes deviating from a route; an action which includes stopping or moving along a route; a predetermined or algorithmically calculated amount of time associated with altering an estimated time duration for a passenger or a vehicle to reach a target location; an en-route action; map data; a profile for a passenger or a vehicle; historical or real-time data; predictions based on historical and real-time data; a geographical area; a rating based on a profile for a passenger or a vehicle; a health rating; a fitness goal; a climate tolerance rating; a mobility rating; a fuel efficiency rating; a fuel efficiency goal rating; a rider capacity rating; a luggage capacity rating; and a luxury rating.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating optimization of passenger pick-up, the method comprising:
   generating, by a first mobile computing device associated with a passenger at a first location, a request for a target location at which to meet with a vehicle;
   receiving the target location, a planned passenger route for the passenger to the target location, and a planned driver route for the vehicle to the target location, wherein the planned passenger route and the planned driver route are calculated based on a location of the vehicle, a facing direction of the vehicle, and a direction of movement, if any, of the vehicle, and wherein the target location is different from the first location; and
   in response to a first action by the vehicle, receiving an updated target location, an updated planned passenger route, and an updated planned driver route,
   wherein the first action includes the vehicle moving along the planned driver route for a first period of time which alters, by an algorithmically calculated amount, the estimated time duration for the passenger or vehicle to reach the target location,
   thereby facilitating optimization of a time duration and route the passenger takes to meet the vehicle.

2. The method of claim 1, further comprising:
   in response to a second action by the passenger, receiving an updated target location, an updated planned passenger route, and an updated planned driver route, which are calculated based on an estimated time duration for the passenger and the vehicle to reach the updated target location.

3. The method of claim 2,
   wherein the first action by the vehicle further includes:
      the vehicle deviating from the planned driver route; and
      the vehicle stopping along the planned driver route for the first altering period of time; and
   wherein the second action by the passenger includes:
      the passenger deviating from the planned passenger route; and
      the passenger stopping or moving along the planned passenger route for a second period of time which alters by an algorithmically calculated amount the estimated time duration for the passenger or the vehicle to reach the target location.

4. The method of claim 1, further comprising one or more of:
   displaying the target location, the planned passenger route, and the planned driver route on the first mobile computing device;
   displaying the updated target location, the updated planned passenger route, and the updated planned driver route on the first mobile computing device;
   displaying the target location, the planned passenger route, and the planned driver route on a second mobile computing device associated with the vehicle;
   displaying the updated target location, the updated planned passenger route, and the updated planned driver route on the second mobile computing device;
   displaying a current location of the passenger as the passenger travels to the target location; and
   displaying a current location of the vehicle as the vehicle travels to the target location.

5. The method of claim 1, wherein the target location, the planned passenger route, and a planned driver route for the vehicle to the target location are calculated further based on one or more of:
   map data retrieved from a central service;
   current and predicted traffic data retrieved from a central service;
   a profile for the passenger;
   a profile for the vehicle;
   a current location and a current direction of movement of the passenger;
   a current location and a current direction of movement of the vehicle;
   historical or real-time data associated with a geographical area including one or more of:

the target location;
the first location of the passenger;
a second location of the vehicle;
the planned passenger route;
the planned driver route;
a current location of the passenger;
a current location of the vehicle;
current and predicted traffic patterns;
information relating to climate or weather; and
an obstacle or any object which affects the traffic behavior; and
predictions based on the historical or the real-time data.

6. The method of claim 1, further comprising:
determining a profile for the passenger based on the passenger's transportation preferences;
determining ratings based on the profile for the passenger, wherein the ratings include one or more of:
  a health rating, which corresponds to a predetermined walking speed;
  a performance rating, which is based on a passenger-defined health goal and passenger walking performance in relation to the passenger-defined health goal;
  a climate tolerance rating, which indicates the passenger's willingness to walk a predetermined distance in a climate based on precipitation, wind, air temperature, or another climate-related factor;
  a mobility rating, which indicates the passenger's capacity for mobility; and
  one or more other ratings based on the profile for the passenger;
analyzing the passenger's behavior;
updating the ratings based on the analyzed behavior; and
including the ratings in the profile for the passenger.

7. The method of claim 1, further comprising:
determining a profile for the vehicle based on the vehicle's or its driver's transportation preferences;
determining ratings based on the profile for the vehicle, wherein the ratings include one or more of:
  a fuel efficiency rating, which indicates a type of vehicle based on a consumption method, which corresponds to a predetermined average driving speed;
  a fuel efficiency goal rating, which indicates a desired level of fuel efficiency for the vehicle;
  a rider capacity rating, which indicates a maximum number of passengers to be carried by the vehicle;
  a luggage capacity rating, which indicates a maximum number of bags to be carried by the vehicle;
  a luxury rating, which indicates a level of quality of the vehicle as related to an experience of a passenger of the vehicle; and
  one or more other ratings based on the profile for the vehicle;
obtaining information about the vehicle model based on manufacturer specifications for the vehicle model;
analyzing the vehicle's behavior;
updating the ratings based on the obtained information and the analyzed behavior; and
including the ratings in the profile for the vehicle.

8. A computer system for facilitating optimization of passenger pick-up, the computer system comprising:
a processor; and
a storage device storing instructions that when executed by the processor cause the processor to perform a method, the method comprising:
  generating, by a first mobile computing device associated with a passenger at a first location, a request for a target location at which to meet with a vehicle;
  receiving the target location, a planned passenger route for the passenger to the target location, and a planned driver route for the vehicle to the target location,
  wherein the planned passenger route and the planned driver route are calculated based on a location of the vehicle, a facing direction of the vehicle, and a direction of movement, if any, of the vehicle, and wherein the target location is different from the first location; and
  in response to a first action by the vehicle, receiving an updated target location, an updated planned passenger route, and an updated planned driver route,
  wherein the first action includes the vehicle moving along the planned driver route for a first period of time which alters, by an algorithmically calculated amount, the estimated time duration for the passenger or vehicle to reach the target location,
  thereby facilitating optimization of a time duration and route the passenger takes to meet the vehicle.

9. The computer system of claim 8, wherein the method further comprises:
in response to a second action by the passenger, receiving an updated target location, an updated passenger route, and an updated planned driver route, which are calculated based on an estimated time duration for the passenger and the vehicle to reach the updated target location.

10. The computer system of claim 9,
wherein the first action by the vehicle further includes:
  the vehicle deviating from the planned driver route; and
  the vehicle stopping along the planned driver route for the first altering period of time; and
wherein the second action by the passenger includes:
  the passenger deviating from the planned passenger route; and
  the passenger stopping or moving along the planned passenger route for a second period of time which alters by an algorithmically calculated amount the estimated time duration for the passenger or the vehicle to reach the target location.

11. The computer system of claim 8, wherein the method further comprises one or more of:
  displaying the target location, the planned passenger route, and the planned driver route on the first mobile computing device;
  displaying the updated target location, the updated planned passenger route, and the updated planned driver route on the first mobile computing device;
  displaying the target location, the planned passenger route, and the planned driver route on a second mobile computing device associated with the vehicle;
  displaying the updated target location, the updated planned passenger route, and the updated planned driver route on the second mobile computing device;
  displaying a current location of the passenger as the passenger travels to the target location; and
  displaying a current location of the vehicle as the vehicle travels to the target location.

12. The computer system of claim 8, wherein the target location, the planned passenger route, and a planned driver route for the vehicle to the target location are calculated further based on one or more of:

map data retrieved from a central service;
current and predicted traffic data retrieved from a central service;
a profile for the passenger;
a profile for the vehicle;
a current location and a current direction of movement of the passenger;
a current location and a current direction of movement of the vehicle; and
historical or real-time data associated with a geographical area including one or more of:
  the target location;
  the first location of the passenger;
  a second location of the vehicle;
  the planned passenger route;
  the planned driver route;
  a current location of the passenger;
  a current location of the vehicle;
  current and predicted traffic patterns;
  information relating to climate or weather; and
  an obstacle or any object which affects the traffic behavior; and
predictions based on the historical or the real-time data.

13. The computer system of claim 8, wherein the method further comprises:
determining a profile for the passenger based on the passenger's transportation preferences;
determining ratings based on the profile for the passenger, wherein the ratings include one or more of:
  a health rating, which corresponds to a predetermined walking speed;
  a performance rating, which is based on a passenger-defined health goal and passenger walking performance in relation to the passenger-defined health goal;
  a climate tolerance rating, which indicates the passenger's willingness to walk a predetermined distance in a climate based on precipitation, wind, air temperature, or another climate-related factor;
  a mobility rating, which indicates the passenger's capacity for mobility; and
  one or more other ratings based on the profile for the passenger;
analyzing the passenger's behavior;
updating the ratings based on the analyzed behavior; and
including the ratings in the profile for the passenger.

14. The computer system of claim 8, wherein the method further comprises:
determining a profile for the vehicle based on the vehicle's or its driver's transportation preferences;
determining ratings based on the profile for the vehicle, wherein the ratings include one or more of:
  a fuel efficiency rating, which indicates a type of vehicle based on a consumption method, which corresponds to a predetermined average driving speed;
  a fuel efficiency goal rating, which indicates a desired level of fuel efficiency for the vehicle;
  a rider capacity rating, which indicates a maximum number of passengers to be carried by the vehicle;
  a luggage capacity rating, which indicates a maximum number of bags to be carried by the vehicle;
  a luxury rating, which indicates a level of quality of the vehicle as related to an experience of a passenger of the vehicle; and
  one or more other ratings based on the profile for the vehicle;
obtaining information about the vehicle model based on manufacturer specifications for the vehicle model;
analyzing the vehicle's behavior;
updating the ratings based on the obtained information and the analyzed behavior; and
including the ratings in the profile for the vehicle.

15. A non-transitory computer-readable storage medium storing instructions that when executed by a computer cause the computer to perform a method, the method comprising:
generating, by a first mobile computing device associated with a passenger at a first location, a request for a target location at which to meet with a vehicle;
receiving the target location, a planned passenger route for the passenger to the target location, and a planned driver route for the vehicle to the target location,
  wherein the planned passenger route and the planned driver route are calculated based on a location of the vehicle, a facing direction of the vehicle, and a direction of movement, if any, of the vehicle, and wherein the target location is different from the first location; and
in response to a first action by the vehicle, receiving an updated target location, an updated planned passenger route, and an updated planned driver route,
  wherein the first action includes the vehicle moving along the planned driver route for a first period of time which alters, by an algorithmically calculated amount, the estimated time duration for the passenger or vehicle to reach the target location,
thereby facilitating optimization of a time duration and route the passenger takes to meet the vehicle.

16. The storage medium of claim 15, wherein the method further comprises:
in response to a second action by the passenger, receiving an updated target location, an updated planned passenger route, and an updated planned driver route, which are calculated based on an estimated time duration for the passenger and the vehicle to reach the updated target location.

17. The storage medium of claim 16,
wherein the first action by the vehicle further includes:
  the vehicle deviating from the planned driver route; and
  the vehicle stopping along the planned driver route for the first altering period of time; and
wherein the second action by the passenger includes:
  the passenger deviating from the planned passenger route; and
  the passenger stopping or moving along the planned passenger route for a second period of time which alters by an algorithmically calculated amount the estimated time duration for the passenger or the vehicle to reach the target location.

18. The storage medium of claim 15, wherein the target location, the planned passenger route, and a planned driver route for the vehicle to the target location are calculated further based on one or more of:
map data retrieved from a central service;
current and predicted traffic data retrieved from a central service;
a profile for the passenger;
a profile for the vehicle;
a current location and a current direction of movement of the passenger;
a current location and a current direction of movement of the vehicle; and
historical or real-time data associated with a geographical area including one or more of:

the target location;
the first location of the passenger;
a second location of the vehicle;
the planned passenger route;
the planned driver route;
a current location of the passenger;
a current location of the vehicle;
current and predicted traffic patterns;
information relating to climate or weather; and
an obstacle or any object which affects the traffic behavior; and
predictions based on the historical or the real-time data.

19. The storage medium of claim 15, wherein the method further comprises:
determining a profile for the passenger based on the passenger's transportation preferences;
determining ratings based on the profile for the passenger, wherein the ratings include one or more of:
a health rating, which corresponds to a predetermined walking speed;
a performance rating, which is based on a passenger-defined health goal and passenger walking performance in relation to the passenger-defined health goal;
a climate tolerance rating, which indicates the passenger's willingness to walk a predetermined distance in a climate based on precipitation, wind, air temperature, or another climate-related factor;
a mobility rating, which indicates the passenger's capacity for mobility; and
one or more other ratings based on the profile for the passenger;
analyzing the passenger's behavior;
updating the ratings based on the analyzed behavior; and
including the ratings in the profile for the passenger.

20. The storage medium of claim 15, wherein the method further comprises:
determining a profile for the vehicle based on the vehicle's or its driver's transportation preferences;
determining ratings based on the profile for the vehicle, wherein the ratings include one or more of:
a fuel efficiency rating, which indicates a type of vehicle based on a consumption method, which corresponds to a predetermined average driving speed;
a fuel efficiency goal rating, which indicates a desired level of fuel efficiency for the vehicle;
a rider capacity rating, which indicates a maximum number of passengers to be carried by the vehicle;
a luggage capacity rating, which indicates a maximum number of bags to be carried by the vehicle;
a luxury rating, which indicates a level of quality of the vehicle as related to an experience of a passenger of the vehicle; and
one or more other ratings based on the profile for the vehicle;
obtaining information about the vehicle model based on manufacturer specifications for the vehicle model;
analyzing the vehicle's behavior;
updating the ratings based on the obtained information and the analyzed behavior; and
including the ratings in the profile for the vehicle.

* * * * *